Patented Jan. 17, 1950

2,494,851

UNITED STATES PATENT OFFICE 2,494,851

METHOD FOR PRODUCING 5,6-DIMETHOXY-8-NITROQUINOLINE

Thurmond A. Williamson, New York, N. Y., assignor to the United States of America as represented by the Secretary of War No Drawing. Application April 8, 1946, Serial No. 660,412

4 Claims. (Cl. 260—289)

This invention relates to a method of producing 5,6-dimethoxy-8-aminoquinoline, represented by the following formula

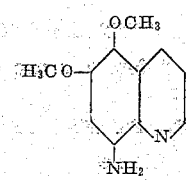

which has important utility as an intermediate for the preparation of certain therapeutic compounds.

This product is disclosed in the Schonhofer U. S. Patent No. 1,879,538, but difficulty has been encountered in preparing it, both by the synthesis asserted by Schonhofer, and by other known methods. For example, attempts have been made to obtain 5,6-dimethoxy-8-nitroquinoline by the usual Skraup reaction, using 4-amino-5-nitroveratrole, with the idea of converting the corresponding 8-nitro compound to the desired 8-amino compound. But the reaction produced a tarry product from which no 5,6-dimethoxy-8-nitroquinoline could be isolated.

In accordance with this invention, a vigorous reaction is produced in a mixture of 4-acetamino-5-nitroveratrole, which may be prepared conveniently by the method described by Jones and Robinson, J. Chem. Soc., 111, page 914 (1917), and glycerin in the presence of concentrated sulfuric acid and arsenic acid; the reaction is permitted to continue for a short reaction time, and is then abruptly terminated. This gives substantial yields of 5,6-dimethoxy-8-nitroquinoline, which may be converted to the desired corresponding 8-amino compound.

The preferred reaction time in the foregoing condensation is about 90 seconds. When the reaction is terminated at about 60 seconds, considerable quantities of deacetylated 4-acetamino-5-nitroveratrole are produced with substantially no yield of the desired substituted quinoline. The reaction time may be continued for longer periods, up to a few minutes. But an increase in the reaction time substantially beyond 90 seconds leads to the formation of excessive amounts of alkali soluble and tarry material, with substantially reduced yields of the desired substituted quinoline, and increased difficulty of recovering the desired product; and a reaction time of about 15 minutes gives substantially none of the desired product.

Thus, the reaction is permitted to continue long enough to give a substantial production of the desired 5,6-dimethoxy-8-nitroquinoline, but is abruptly interrupted prior to substantial cleavage of the extremely labile methoxyl group in the position para to the nitro group, which largely avoids the competitive reaction by which this methoxyl group is converted to the hydroxyl group.

The 5,6-dimethoxy-8-nitroquinoline is converted to the corresponding 8-amino compound by reduction, preferably with stannous chloride. Cleavage of the 5-methoxy group is substantially avoided by conducting the reduction at a low temperature. This reduction produces a tin complex from which the 5,6-dimethoxy-8-aminoquinoline may be liberated by careful treatment with a strong alkali solution, again maintaining a low temperature. The alkali solution is added slowly, and first causes the precipitation of a tin salt. This redissolves as more alkali is added, and finally a precipitate is formed which consists of the desired 5,6-dimethoxy-8-aminoquinoline. This produce is somewhat unstable and susceptible to atmospheric oxidation.

This invention is exemplified as follows:

Relatively dry glycerin (dynamite grade) is further dried by heating it in an evaporating dish at about 165–170° C. for about 15 minutes. While the glycerin is still above 150° C., 365 ml. of it is rapidly mixed with 70 g. of arsenic acid and 120 g. of 4-acetamino-5-nitroveratrole. The mixture is thoroughly slurried by shaking and 150 ml. of concentrated sulfuric acid is added slowly down the sides of the flasks, while the mixture is continuously agitated as by swirling.

Preferably, these steps are completed before the temperature of the mixture falls below about 150° C., but the temperature may become less than 150° C., and is brought back up by careful heating, with shaking.

After a few seconds at the high temperature, a vigorous exothermic reaction starts. The agitation of the mixture is continued during this reaction.

The reaction is permitted to continue for about 90 seconds, and is then abruptly terminated, conveniently pouring the mixture into about 1.5 liters of ice water.

This forms an acid solution, which is filtered to remove insoluble material. The filtrate is made alkaline with a solution of about 400 g. of sodium hydroxide, which produces a precipitation of crude 5,6-dimethoxy-8-nitroquinoline. This is recovered and dissolved in 400 ml. of 10 percent hydrochloric acid. The resulting solution is filtered, and the 5,6-dimethoxy-8-nitroquinoline is reprecipitated from the acid filtrate with ammonia. The product may be recrystallized from 600 ml. of 70 percent alcohol, to yield about 47 g. of tan needles melting at 127–128° C.

To a well stirred solution of 104 g. of stannous chloride dihydrate in 300 ml. of hydrochloric acid (sp. gr. 1.19) cooled to below 10° C. in an ice bath, a solution of 26 g. of 5,6-dimethoxy-8-nitroquinoline in 100 ml. of hydrochloric acid (sp. gr. 1.19) is added dropwise. When the addition is complete, the solution is stirred for about an hour at 10° C., and then allowed to come to room temperature and stirred for an additional two hours. A canary yellow tin complex precipitate forms in the reaction mixture, and this is redissolved by the addition of warm water. The resulting orange-red solution, cooled in an ice bath, is made strongly alkaline by careful addition of concentrated sodium hydroxide solution, ice being added to keep the temperature below 20° C. During the course of the addition of sodium hydroxide solution, a tin salt precipitates first but redissolves as more alkali is added, and finally the desired 5,6-dimethoxy-8-aminoquinoline separates in the form of micro plates, which are washed thoroughly with water. This yields about 22 g. (96 percent) of substantially pure 5,6-dimethoxy-8-aminoquinoline, melting at 148–149° C.

I claim:

1. In the process of synthesizing a 5,6-dimethoxy-8-nitroquinoline by ring closure on 4-acetamino-5-nitroveratrole by the action of sulphuric acid, the steps which comprise adding the sulphuric acid to a hot mixture of 4-acetamino-5-nitroveratrole, glycerine, and arsenic acid, whereby the reaction is prompt and vigorous, and abruptly terminating the reaction prior to substantial cleavage of the methoxyl substituent para to the nitro-group.

2. The process which comprises preparing a mixture of 4-acetamino-5-nitroveratrole, glycerin, sulfuric acid, and arsenic acid at a temperature sufficient to initiate a vigorous exothermic reaction therein, permitting said reaction to continue for about 90 seconds, then abruptly terminating said reaction, and recovering 5,6-dimethoxy-8-nitroquinoline from the reaction mixture.

3. The process which comprises preparing a mixture of 4-acetamino-5-nitroveratrole, glycerin, and arsenic acid, at a temperature above about 150° C., adding sulfuric acid thereto to cause a vigorous exothermic reaction, permitting the reaction to continue for a short period, abruptly terminating the reaction, and recovering 5,6-dimethoxy-8-nitroquinoline.

4. In the process of synthesizing a 5,6-dimethoxy-8-nitroquinoline by ring closure on 4-acetamino-5-nitroveratrole by the action of sulfuric acid, the steps which comprise adding the sulfuric acid to a hot mixture of 4-acetamino-5-nitroveratrole, glycerin, and arsenic acid, whereby the reaction is prompt and vigorous, and abruptly terminating the reaction after about 90 seconds.

THURMOND A. WILLIAMSON.

REFERENCES CITED

The following references are of record in the file of this patent:

UNITED STATES PATENTS

| Number | Name | Date |
|---|---|---|
| 1,703,365 | Schulemann et al. | Feb. 26, 1929 |
| 1,879,538 | Schonhofer | Sept. 27, 1932 |

FOREIGN PATENTS

| Number | Country | Date |
|---|---|---|
| 727,528 | France | Mar. 29, 1932 |
| 1,699 of 1931 | Australia | Apr. 28, 1932 |

OTHER REFERENCES

Misani et al., J. Org. Chem., vol. 10, pp. 347–365 (1945).